(12) United States Patent
Finn et al.

(10) Patent No.: US 8,732,035 B2
(45) Date of Patent: May 20, 2014

(54) COMPETITIVE SALES ENVIRONMENT IN A VIRTUAL WORLD

(75) Inventors: Peter G. Finn, Brampton (CA); Rick A. Hamilton, II, Charlottesville, VA (US); Neil A. Katz, Parkland, FL (US); James W. Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 895 days.

(21) Appl. No.: 12/144,788

(22) Filed: Jun. 24, 2008

(65) Prior Publication Data

US 2009/0319390 A1 Dec. 24, 2009

(51) Int. Cl.
    *G06Q 30/00* (2012.01)
    *G06Q 40/00* (2012.01)

(52) U.S. Cl.
    USPC .......... 705/26.4; 705/41; 705/26.1; 705/26.3; 705/26.41

(58) Field of Classification Search
    USPC ..................................... 705/26, 41
    See application file for complete search history.

(56) References Cited

U.S. PATENT DOCUMENTS

| | | | |
|---|---|---|---|
| 6,748,376 B1 | 6/2004 | Beall et al. | |
| 6,792,401 B1 | 9/2004 | Nigro et al. | |
| 6,985,874 B1 | 1/2006 | Ebihara et al. | |
| 7,353,016 B2 | 4/2008 | Roundtree et al. | |
| 2002/0018076 A1* | 2/2002 | Gianola | 345/733 |
| 2002/0103746 A1* | 8/2002 | Moffett, Jr. | 705/37 |
| 2003/0004743 A1 | 1/2003 | Callegari | |
| 2003/0046410 A1* | 3/2003 | Gusler et al. | 709/229 |
| 2003/0055745 A1 | 3/2003 | Kim | |
| 2003/0128205 A1 | 7/2003 | Varghese | |
| 2005/0125229 A1* | 6/2005 | Kurzweil | 704/270 |
| 2005/0251440 A1* | 11/2005 | Bednarek | 705/10 |
| 2006/0122917 A1 | 6/2006 | Lokuge et al. | |
| 2006/0248461 A1 | 11/2006 | Yamada et al. | |
| 2006/0253394 A1* | 11/2006 | Mao | 705/40 |
| 2007/0166690 A1 | 7/2007 | Johnson | |
| 2007/0250403 A1* | 10/2007 | Altschuler | 705/26 |
| 2007/0299743 A1* | 12/2007 | Staib et al. | 705/27 |
| 2008/0086696 A1 | 4/2008 | Sri Prakash et al. | |
| 2008/0140581 A1* | 6/2008 | Mayer | 705/80 |
| 2008/0263459 A1 | 10/2008 | Altberg et al. | |

FOREIGN PATENT DOCUMENTS

| | | | | |
|---|---|---|---|---|
| JP | 2002236834 A | * | 8/2002 | G06F 17/60 |
| JP | 2007157099 A | * | 6/2007 | |

OTHER PUBLICATIONS

Bahl, Sangeeta, U.S. Appl. No. 12/144,877, Office Action Communication, Mar. 31, 2011, 11 pages.
Bahl, U.S. Appl. No. 12/144,877, Office Action Communication, Aug. 3, 2011, 13 pages.

(Continued)

*Primary Examiner* — Ryan Zeender
*Assistant Examiner* — Ariel Yu
(74) *Attorney, Agent, or Firm* — Lisa Ulrich; Hoffman Warnick LLC

(57) ABSTRACT

The invention provides a method, system, and program product for providing a competitive sales environment in a virtual world. In one embodiment, the invention comprises receiving a request for product or service information from a consumer avatar, querying a database of vendors based on the request for product or service information, identifying at least one vendor relevant to the request for product or service information, notifying the at least one vendor of the request, and making available to the consumer avatar a sales environment based on the request for product or service information.

21 Claims, 3 Drawing Sheets

(56) References Cited

OTHER PUBLICATIONS

Sangeeta Bahl, U.S. Appl. No. 12/144,877, USPTO Office Action, Dec. 22, 2011, 11 pages.

Sangeeta Bahl, U.S. Appl. No. 12/144,877, USPTO Final Office Action, May 24, 2012, 16 pages.

Bahl, Office Action Communication for U.S. Appl. No. 12/144,877 dated May 31, 2013, 17 pages.

* cited by examiner

COMPETITIVE SALES ENVIRONMENT IN A VIRTUAL WORLD

CROSS-REFERENCE TO RELATED APPLICATIONS

This application is related in some aspects to co-pending U.S. patent application Ser. No. 12/144,877, entitled "PERSONAL SERVICE ASSISTANCE IN A VIRTUAL UNIVERSE," which is incorporated herein by reference.

FIELD OF THE INVENTION

The invention relates generally to virtual worlds and more specifically to the provision of a competitive sales environment in a virtual world in which virtual beings (avatars) interact.

BACKGROUND OF THE INVENTION

Avatars in virtual worlds can have a wide range of business and social experiences. In fact, in some virtual worlds, such as Second Life® (a registered trademark of Linden Research, Inc.), the avatar-to-avatar business interactions and the virtual economy they generate, represent a significant portion of the experiences available in the virtual world. Just as in the real world, however, the increased complexity and depth of the business interactions available in virtual worlds pose obstacles to an avatar's ability to take full advantage of the opportunities available.

For example, where an avatar is interested in purchasing a class or type of product or service, as opposed to a specific product or service available from only one source, the avatar may need to visit or otherwise contact multiple vendors in order to obtain the best price or conditions. Where a large number of vendors of the product or service exist, it is often the case, as in the real world, that not every vendor will be contacted and, as a result, the prospective purchaser will not receive the best price or conditions available.

Accordingly, there exists a need in the art to overcome the deficiencies and limitations described hereinabove.

SUMMARY OF THE INVENTION

The invention provides a method, system, and program product for providing a competitive sales environment in a virtual world.

A first aspect of the invention provides a method of providing a competitive sales environment in a virtual world, the method comprising: receiving a request for product or service information from a consumer avatar; querying a database of vendors based on the request for product or service information; identifying at least one vendor relevant to the request for product or service information; notifying the at least one vendor of the request; and making available to the consumer avatar a sales environment based on the request for product or service information.

A second aspect of the invention provides a system for providing a competitive sales environment in a virtual world, the system comprising: a system for receiving a request for product or service information from a consumer avatar; a system for querying a database of vendors based on the request for product or service information; a system for identifying at least one vendor relevant to the request for product or service information; a system for notifying the at least one vendor of the request; and a system for making available to the consumer avatar a sales environment based on the request for product or service information.

A third aspect of the invention provides a program product stored on a computer-readable medium, which when executed, provides a competitive sales environment in a virtual world, the program product comprising: program code for receiving a request for product or service information from a consumer avatar; program code for querying a database of vendors based on the request for product or service information; program code for identifying at least one vendor relevant to the request for product or service information; program code for notifying the at least one vendor of the request; and program code for making available to the consumer avatar a sales environment based on the request for product or service information.

A fourth aspect of the invention provides a method for deploying an application for providing a competitive sales environment in a virtual world, comprising: providing a computer infrastructure being operable to: receive a request for product or service information from a consumer avatar; query a database of vendors based on the request for product or service information; identify at least one vendor relevant to the request for product or service information; notify the at least one vendor of the request; and make available to the consumer avatar a sales environment based on the request for product or service information.

The illustrative aspects of the present invention are designed to solve the problems herein described and other problems not discussed, which are discoverable by a skilled artisan.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Figure 1:
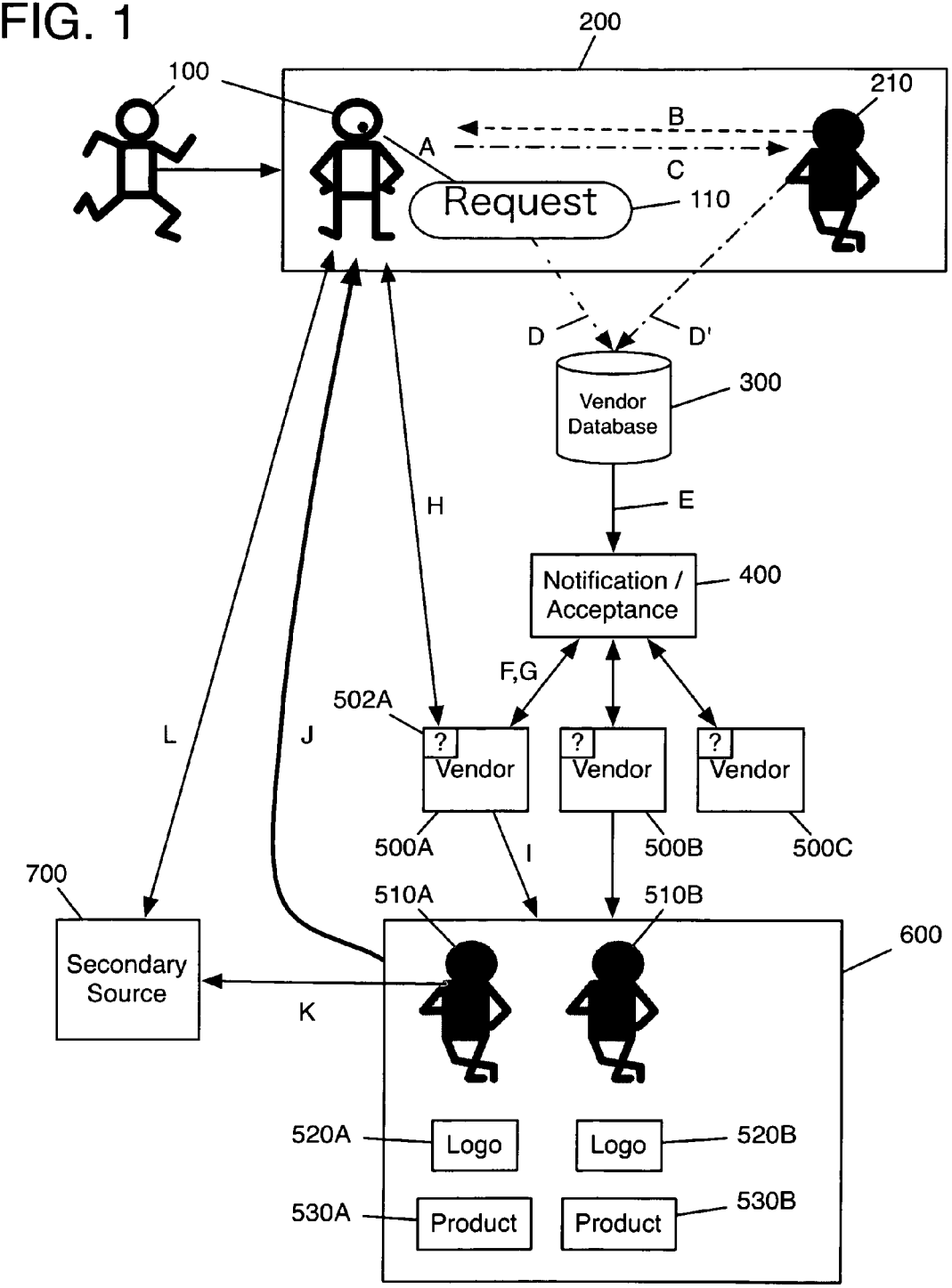
FIG. 1 shows a block and flow diagram of an illustrative method according to an embodiment of the invention.

Turning now to the drawings, FIG. 1 shows a flow diagram of an illustrative method according to an embodiment of the invention. A consumer avatar 100 enters a sales portal 200 and requests (A) product or service information. For example, the consumer avatar 100 may wish to purchase a car, in which case the request 110 may take the form of a statement, such as "I would like to buy a car." Thus, the request 110 need not be in the form of a question, but simply must make clear to a vendor that the consumer avatar 110 is desirous of information necessary to make a choice regarding the purchase of a product or service.

The sales portal 200 is staffed by one or more virtual customer service representatives (CSRs) 210. The virtual CSR 210 need not be a real-time CSR avatar, but may instead be a virtual CSR, such as an artificial intelligence robot (AI bot) capable of engaging with the consumer avatar 110 on a relatively noncomplex basis. For example, in the case that the request 110 contains insufficient detail (such as the "I would like to buy a car" example above), the virtual CSR 210 may be programmed to solicit (B) and receive (C) additional information from the consumer avatar 100. For example, the virtual CSR 210 may inquire as to whether the consumer avatar 100 wishes to purchase a particular style or make of car or how much the consumer avatar 100 is willing to spend.

In the case that the request 110 is sufficiently clear and complete on its own, it may be used to query (D) a vendor database 300 to identify one or more vendors whose products or services are relevant to the request 110. If a virtual CSR 210 is employed to solicit and receive additional information from the consumer avatar 100, such additional information may also be used to query (D') the vendor database 300 and identify relevant vendor(s).

Once so identified, the vendor information is sent (E) to a notification and acceptance module 400, from which one or more vendors 500A-C are notified (F) of the relevance of the request 110 to their product or service and asked to participate or decline participation in a competitive sales attempt. A vendor's response (G) may be based, for example, on the request 100, any additional information obtained by the virtual CSR 210, as well as the number and/or identities of the other vendors notified (F). For example, a vendor may choose not to participate if the amount the consumer avatar 100 wishes to spend is below a particular threshold or if more than a preset number of other vendors are notified. In some embodiments, these two criteria may be related, such that a vendor may choose to participate even though the amount the consumer avatar 100 wishes to spend is low if only a few other vendors are notified (F).

In some embodiments, each vendor (e.g., 500A) may include or utilize a qualification module 502A for engaging in an interactive session (H) with the consumer avatar 100 in order to collect still more information regarding the request 110. Such information may include, for example, information specific to the vendor's product or service (e.g., an optional feature specific to the particular vendor's product or service). As above, such information may be solicited and gathered by a CSR avatar of the vendor and/or an AI bot. For the sake of simplicity and clarity, only vendor 500A is shown engaging in an interactive session (H) with the consumer avatar 100. However, it should be noted that any vendor may include or utilize a qualification module in such a manner.

In FIG. 1, vendor 500A and vendor 500B have chosen to participate in the competitive sale and vendor 500C has chosen not to participate. A vendor's response (G) may be logged in the vendor database 300 and used to make future identifications of relevant vendors. For example, if vendor 500C has repeatedly chosen not to participate where the prospective sale was below a particular value or where vendor 500A was also identified, vendor 500C may be excluded from the group of identified vendors in the future if either such condition is present.

Where at least one vendor has chosen to participate, a virtual showroom 600 is created or modified and made available (J) to the consumer avatar 100, within the sales portal 200 or elsewhere. Vendor CSR avatars 510A-B (i.e., real-time avatars) are present within the virtual showroom and available for interaction with the consumer avatar. In some embodiments of the invention, all avatars present in the virtual showroom 600 (i.e., the consumer avatar 100 and any vendor CSR avatars 510A-B) may be permitted to see and/or hear all interactions in the virtual showroom 600. In other embodiments, the consumer avatar 100 may discretely interact with individual vendor CSR avatars 510A-B. That is, in such embodiments, each vendor CSR avatar is unaware of the substance (or possibly even the existence) of the consumer avatar's interactions with other vendor CSR avatars. In still other embodiments, multiple consumer avatars may be present in the virtual showroom 600, with each capable of carrying out public or discrete interactions with the vendor CSR avatars present.

The virtual showroom 600 may also include, for example, a vendor's logo 520A-B, product 530A-B, or a representation of the vendor's product or service. Thus, a consumer avatar 100 may more easily identify vendors with whom the consumer avatar 100 wishes to interact.

In some embodiments of the invention, a vendor CSR avatar 510A may solicit (K) a secondary source 700 for products or services based on the interactions between the vendor CSR avatar 510 and the consumer avatar 100. For example, to continue with the example wherein the consumer avatar 100 is interested in buying a car, the vendor CSR avatar 510A may solicit insurance quotes from a secondary source 700 (i.e., an insurance provider). Such solicitation may occur following completion of a sale to the consumer avatar 100 or as part of the competitive sales process (e.g., a consumer avatar's decision whether to buy a particular vendor's vehicle may turn on the cost of insuring that vehicle). The secondary source 700 and the consumer avatar 100 may then interact (L) to negotiate and/or execute the sale of a secondary product or service.

Figure 2:
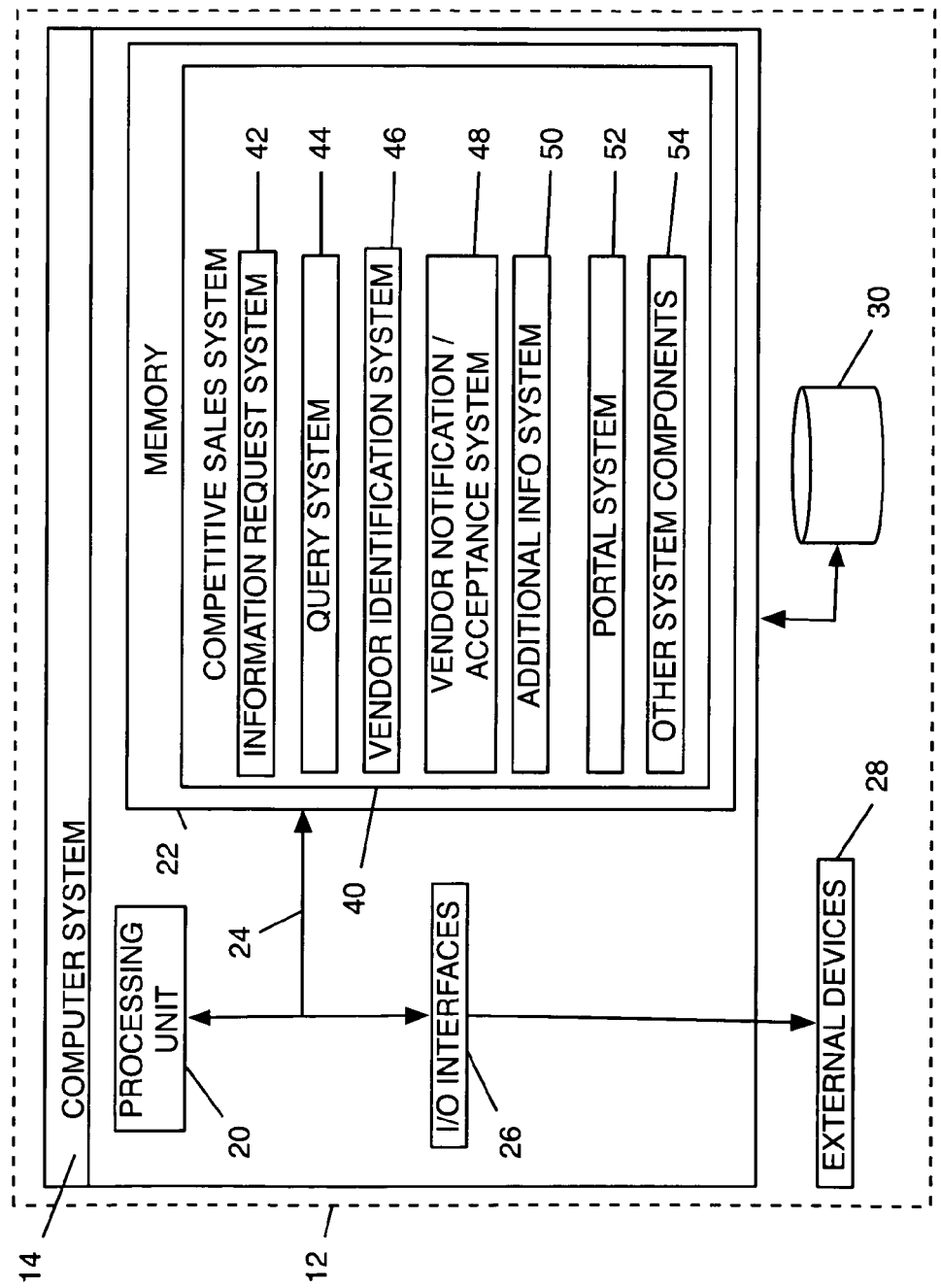
FIG. 2 shows a block diagram of an illustrative system according to an embodiment of the invention.

FIG. 2 shows an illustrative system 10 for providing a competitive sales environment in a virtual world. To this extent, system 10 includes a computer infrastructure 12 that can perform the various process steps described herein for providing a competitive sales environment. In particular, computer infrastructure 12 is shown including a computer system 14 that comprises a competitive sales system 40, which enables computer system 14 to provide a competitive sales environment by performing the process steps of the invention.

Computer system 14 is shown including a processing unit 20, a memory 22, input/output (I/O) interfaces 26, and a bus 24. Further, computer system 14 is shown in communication with external devices 28 and a storage system 30. As is known in the art, in general, processing unit 20 executes computer program code, such as competitive sales system 40, that is stored in memory 22 and/or storage system 30. While executing computer program code, processing unit 20 can read and/or write data from/to memory 22, storage system 30, and/or I/O interface 26. Bus 24 provides a communication link between each of the components in computer system 14. External devices 28 can comprise any device that enables a user (not shown) to interact with computer system 14 or any device that enables computer system 14 to communicate with one or more other computer systems.

In any event, computer system 14 can comprise any general purpose computing article of manufacture capable of executing computer program code installed by a user (e.g., a personal computer, server, handheld device, etc.). However, it is understood that computer system 14 and competitive sales system 40 are only representative of various possible computer systems that may perform the various process steps of the invention. To this extent, in other embodiments, computer system 14 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, computer infrastructure 12 is only illustrative of various types of computer infrastructures for implementing the invention. For example, in one embodiment, computer infrastructure 12 comprises two or more computer systems (e.g., a server cluster) that communicate over any type of wired and/or wireless communications link, such as a network, a shared memory, or the like, to perform the various process steps of the invention. When the communications link comprises a network, the network can comprise any combination of one or more types of networks (e.g., the Internet, a wide area network, a local area network, a virtual private network, etc.). Regardless, communications between the computer systems may utilize any combination of various types of transmission techniques.

As previously mentioned, the competitive sales system 40 enables the computer system 14 to provide a competitive sales environment in a virtual world. To this extent, the competitive sales system 40 is shown including an information request system 42, a query system 44, a vendor identification system 46, a vendor notification and acceptance system 48, an additional information system 50, and a portal system 52. Operation of each of these systems is discussed above. The competitive sales system 40 may further include other system components 54 to provide additional or improved functionality to the competitive sales system 40. It is understood that some of the various systems shown in FIG. 2 can be implemented independently, combined, and/or stored in memory for one or more separate computer systems 14 that communicate over a network. Further, it is understood that some of the systems and/or functionality may not be implemented, or additional systems and/or functionality may be included as part of system 10.

While shown and described herein as a method and system for providing a competitive sales environment in a virtual world, it is understood that the invention further provides various alternative embodiments. For example, in one embodiment, the invention provides a computer-readable medium that includes computer program code to enable a computer infrastructure to provide a competitive sales environment. To this extent, the computer-readable medium includes program code, such as competitive sales system 40, that implements each of the various process steps of the invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computer system, such as memory 22 and/or storage system 30 (e.g., a fixed disk, a read-only memory, a random access memory, a cache memory, etc.), and/or as a data signal traveling over a network (e.g., during a wired/wireless electronic distribution of the program code).

In another embodiment, the invention provides a business method that performs the process steps of the invention on a subscription, advertising, and/or fee basis. That is, a service provider could offer to provide a competitive sales environment in a virtual world, as described above. In this case, the service provider can create, maintain, support, etc., a computer infrastructure, such as computer infrastructure 12, that performs the process steps of the invention for one or more customers. In return, the service provider can receive payment from the customer(s) under a subscription and/or fee agreement and/or the service provider can receive payment from the sale of advertising space to one or more third parties.

In still another embodiment, the invention provides a method of generating a system for providing a competitive sales environment. In this case, a computer infrastructure, such as computer infrastructure 12, can be obtained (e.g., created, maintained, having made available to, etc.) and one or more systems for performing the process steps of the invention can be obtained (e.g., created, purchased, used, modified, etc.) and deployed to the computer infrastructure. To this extent, the deployment of each system can comprise one or more of (1) installing program code on a computer system, such as computer system 14, from a computer-readable medium; (2) adding one or more computer systems to the computer infrastructure; and (3) incorporating and/or modifying one or more existing systems of the computer infrastructure, to enable the computer infrastructure to perform the process steps of the invention.

As used herein, it is understood that the terms "program code" and "computer program code" are synonymous and mean any expression, in any language, code or notation, of a set of instructions intended to cause a computer system having an information processing capability to perform a particular function either directly or after either or both of the following: (a) conversion to another language, code or notation; and (b) reproduction in a different material form. To this extent, program code can be embodied as one or more types of program products, such as an application/software program, component software/a library of functions, an operating system, a basic I/O system/driver for a particular computing and/or I/O device, and the like.

Figure 3:
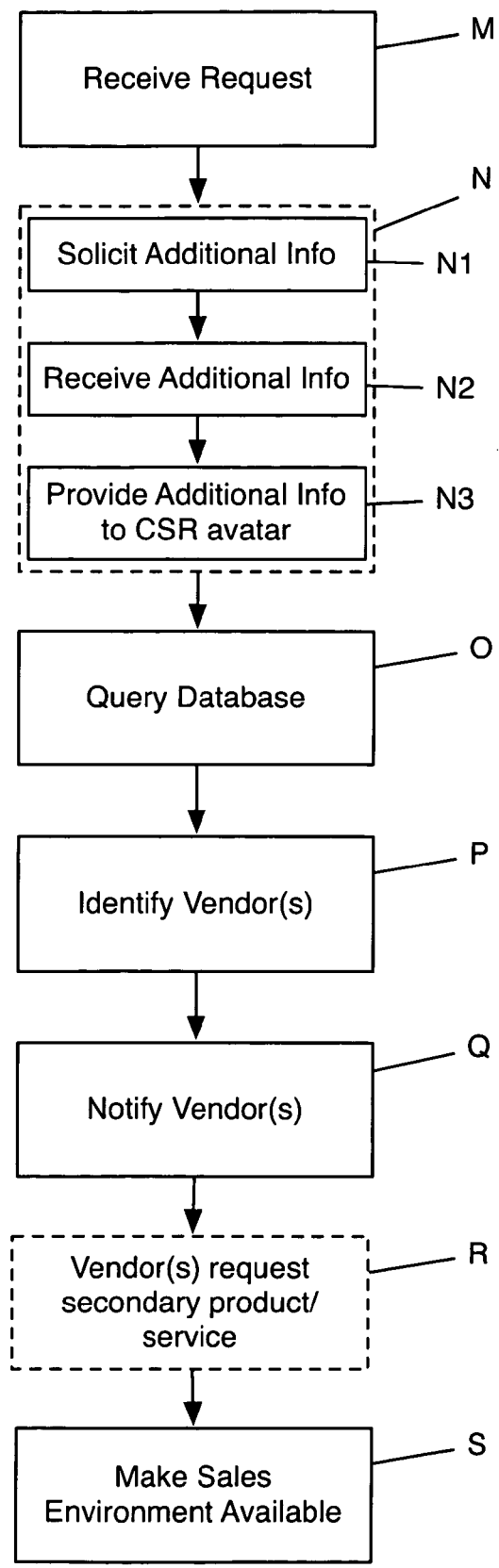
FIG. 3 shows a flow diagram of an illustrative method according to an embodiment of the invention.

FIG. 3 shows a flow diagram of an illustrative method according to an embodiment of the invention. At M, a request from a consumer avatar is received. At N, additional information may optionally be solicited N1, received N2, and, in the case that such soliciting and receiving is performed by a virtual CSR or AI bot, provided N3 to a CSR avatar.

At 0, a vendor database is queried and at P, at least one vendor from the database is identified based on the consumer avatar's request. At Q, such vendor(s) is/are notified of the request and, as explained above, asked to accept or decline participation in a competitive sale to the consumer avatar.

At R, one or more vendors may optionally request a secondary product or service on behalf of the consumer avatar. At S, a virtual sales environment is made available to the consumer avatar, as described above with respect to FIG. 1. While shown in FIG. 3 as occurring before the sales environment is made available, it should be understood that a vendor may request a secondary product or service after the sales environment is made available or after a sale is completed between the vendor and the consumer avatar.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method of providing a competitive sales environment in a virtual world, the method comprising:

receiving, by at least one computing device, a request for product or service information from a consumer avatar;

querying, by the at least one computing device, a database of vendors based on the request for product or service information;

identifying, by the at least one computing device, at least one vendor relevant to the request for product or service information;
notifying, by the at least one computing device, the at least one vendor of the request;
querying, by the at least one computing device, the at least one vendor to participate or decline participation in a sales environment with the consumer avatar;
receiving, by the at least one computing device, a response from the at least one vendor, wherein the response of the at least one vendor is based on the request for product or service information and a quantity of vendors notified being below a predetermined threshold; and
in response to the at least one vendor accepting the query to participate in the sales environment with the consumer avatar, making available to the consumer avatar, using the at least one computing device, the sales environment based on the request for product or service information.

2. The method of claim 1, further comprising:
soliciting, using the at least one computing device, from the consumer avatar additional information using a virtual customer service representative (CSR);
accepting, using the at least one computing device, additional information from the consumer avatar; and
providing, using the at least one computing device, the additional information to a CSR avatar.

3. The method of claim 1, further comprising:
a vendor customer service representative (CSR) avatar soliciting, using the at least one computing device, additional information from the consumer avatar.

4. The method of claim 1, further comprising:
requesting, using the at least one computing device, a secondary product or service on behalf of the consumer avatar.

5. The method of claim 4, wherein the secondary product or service is requested by a customer service representative (CSR) avatar.

6. The method of claim 5, further comprising:
determining, using the at least one computing device, based on the request for product or service information, a secondary product or service relevant to the request for product or service information.

7. The method of claim 1, further comprising:
creating, using the at least one computing device, a sales environment based on the request for product or service information.

8. The method of claim 1, further comprising:
modifying, using the at least one computing device, an existing sales environment based on the request for product or service information.

9. The method of claim 8, wherein modifying includes adding, using the at least one computing device, at least one of the following to the existing sales environment: a customer service representative (CSR) avatar, a vendor's logo, a vendor's product, and a representation of a vendor's product or service.

10. A system for providing a competitive sales environment in a virtual world, the system comprising:
at least one computing device for performing a method, the method comprising:
receiving a request for product or service information from a consumer avatar;
querying a database of vendors based on the request for product or service information;
identifying at least one vendor relevant to the request for product or service information;
notifying the at least one vendor of the request;
querying the at least one vendor to participate or decline participation in a sales environment with the consumer avatar;
receiving a response from the at least one vendor, wherein the response of the at least one vendor is based on the request for product or service information and a quantity of vendors notified being below a predetermined threshold; and
in response to the at least one vendor accepting the query to participate in the sales environment with the consumer avatar, making available to the consumer avatar the sales environment based on the request for product or service information.

11. The system of claim 10, the method further comprising:
soliciting from the consumer avatar additional information using a virtual customer service representative (CSR);
accepting additional information from the consumer avatar; and
providing the additional information to a CSR avatar.

12. The system of claim 10, the method further comprising:
allowing a vendor customer service representative (CSR) to solicit additional information from the consumer avatar.

13. The system of claim 10, the method further comprising:
requesting a secondary product or service on behalf of the consumer avatar.

14. The system of claim 13, the method further comprising:
determining, based on the request for product or service information, a secondary product or service relevant to the request for product or service information.

15. The system of claim 10, the method further comprising:
creating a sales environment based on the request for product or service information.

16. The system of claim 10, the method further comprising:
modifying an existing sales environment based on the request for product or service information.

17. A program product stored on a non-transitory computer-readable medium, which when executed, provides a competitive sales environment in a virtual world, the program product comprising:
program code for receiving a request for product or service information from a consumer avatar;
program code for querying a database of vendors based on the request for product or service information;
program code for identifying at least one vendor relevant to the request for product or service information;
program code for notifying the at least one vendor of the request;
program code for querying the at least one vendor to participate or decline participation in a sales environment with the consumer avatar;
program code for receiving a response from the at least one vendor, wherein the response of the at least one vendor is based on the request for product or service information and a quantity of vendors notified being below a predetermined threshold; and
in response to the at least one vendor accepting the query to participate in the sales environment with the consumer avatar, program code for making available to the consumer avatar the sales environment based on the request for product or service information.

18. The program product of claim 17, further comprising:
program code for soliciting from the consumer avatar additional information using a virtual customer service representative (CSR);
program code for accepting additional information from the consumer avatar; and program code for providing the additional information to a CSR avatar.

19. The program product of claim 17, further comprising: program code for requesting a secondary product or service on behalf of the consumer avatar.

20. The program product of claim 17, further comprising at least one program code selected from a group consisting of:
   program code for creating a sales environment based on the request for product or service information; and
   program code for modifying a sales environment based on the request for product or service information.

21. A method for deploying an application for providing a competitive sales environment in a virtual world, comprising:
   providing a computer infrastructure being operable to:
   receive, by at least one computing device, a request for product or service information from a consumer avatar;
   query, by the at least one computing device, a database of vendors based on the request for product or service information;
   identify, by the at least one computing device, at least one vendor relevant to the request for product or service information;
   notify, by the at least one computing device, the at least one vendor of the request;
   query, by the at least one computing device, the at least one vendor to participate or decline participation in a sales environment with the consumer avatar;
   receive, by the at least one computing device, a response from the at least one vendor, wherein the response of the at least one vendor is based on the request for product or service information and a quantity of vendors notified being below a predetermined threshold; and
   in response to the at least one vendor accepting the query to participate in the sales environment with the consumer avatar, make available to the consumer avatar the sales environment based on the request for product or service information.

* * * * *